(12) United States Patent
Choi et al.

(10) Patent No.: US 9,023,166 B2
(45) Date of Patent: May 5, 2015

(54) METHOD OF TRANSFERRING GRAPHENE

(71) Applicant: Electronics and Telecommunications Research Institute, Daejeon (KR)

(72) Inventors: Jin Sik Choi, Daejeon (KR); Young-Jun Yu, Daejeon (KR); Jin Tae Kim, Daejeon (KR); Kwang Hyo Chung, Daejeon (KR); Doo Hyeb Youn, Daejeon (KR); Choon Gi Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 62 days.

(21) Appl. No.: 13/923,490

(22) Filed: Jun. 21, 2013

(65) Prior Publication Data

US 2014/0238591 A1   Aug. 28, 2014

(30) Foreign Application Priority Data

Feb. 28, 2013   (KR) ........................ 10-2013-0022261

(51) Int. Cl.
*B44C 1/17* (2006.01)
*B44C 1/175* (2006.01)
*B32B 38/10* (2006.01)
*B32B 43/00* (2006.01)
*C01B 31/04* (2006.01)

(52) U.S. Cl.
CPC ................ *C01B 31/0484* (2013.01)

(58) Field of Classification Search
CPC  C01B 31/0469; C01B 31/0484; B44C 1/175; B44C 1/1756; H05K 3/06; H05K 3/20; B05D 5/10; C23C 14/0005; C23C 26/00; H01L 21/6835; B29C 63/0013

USPC ......... 156/230, 233, 234, 236, 237, 240, 247, 156/249
See application file for complete search history.

(56) References Cited

U.S. PATENT DOCUMENTS

| 7,052,588 | B2 * | 5/2006 | Gu et al. .................. 204/403.01 |
| 7,371,696 | B2 * | 5/2008 | Jin et al. ........................ 438/758 |
| 7,504,132 | B2 * | 3/2009 | Afzali-Ardakani et al. .. 427/256 |
| 7,932,110 | B2 * | 4/2011 | Kim et al. ........................ 438/30 |
| 8,007,617 | B2 * | 8/2011 | Min et al. ...................... 156/235 |
| 8,075,864 | B2 * | 12/2011 | Choi et al. .................... 423/448 |
| 8,232,561 | B2 * | 7/2012 | Rinzler et al. .................. 257/79 |

(Continued)

FOREIGN PATENT DOCUMENTS

KR   1020040105975 A   12/2004
KR   1020070067442 A   6/2007

(Continued)

OTHER PUBLICATIONS

English Abstract of WO 2014/021640 (Oct. 16, 2014).*

(Continued)

*Primary Examiner* — Sing P Chan
(74) *Attorney, Agent, or Firm* — Ladas & Parry LLP (57) ABSTRACT

A method of transferring graphene is provided. A method of transferring graphene in accordance with an exemplary embodiment of the present invention may include forming a graphene layer by composing graphene and a base layer, depositing a self-assembled monolayer on the graphene layer, and separating a combination layer comprising the self-assembled monolayer and the graphene layer from the base layer.

6 Claims, 7 Drawing Sheets

(56) References Cited

U.S. PATENT DOCUMENTS

| | | | |
|---|---|---|---|
| 8,268,180 B2* | 9/2012 | Arnold et al. | 216/56 |
| 8,337,949 B2* | 12/2012 | Choi et al. | 427/227 |
| 8,569,121 B2* | 10/2013 | Haensch et al. | 438/160 |
| 8,592,820 B2* | 11/2013 | Kim et al. | 257/72 |
| 8,637,346 B1* | 1/2014 | Jung et al. | 438/99 |
| 8,702,897 B2* | 4/2014 | Lin et al. | 156/322 |
| 8,723,024 B2* | 5/2014 | Choi et al. | 136/263 |
| 8,802,514 B2* | 8/2014 | Haensch et al. | 438/160 |
| 2004/0104129 A1* | 6/2004 | Gu et al. | 205/775 |
| 2007/0148588 A1 | 6/2007 | Park et al. | |
| 2009/0068471 A1* | 3/2009 | Choi et al. | 428/408 |
| 2009/0071533 A1* | 3/2009 | Choi et al. | 136/252 |
| 2009/0142581 A1* | 6/2009 | Heintz et al. | 428/323 |
| 2009/0183816 A1* | 7/2009 | Min et al. | 156/62.2 |
| 2009/0324897 A1* | 12/2009 | Choi et al. | 428/195.1 |
| 2010/0065818 A1* | 3/2010 | Kim et al. | 257/14 |
| 2010/0304101 A1* | 12/2010 | Lin et al. | 428/212 |
| 2010/0320439 A1* | 12/2010 | Jin et al. | 257/10 |
| 2011/0143045 A1* | 6/2011 | Veerasamy | 427/495 |
| 2011/0186805 A1 | 8/2011 | Bowers et al. | |
| 2011/0210308 A1* | 9/2011 | Kim et al. | 257/9 |
| 2012/0058350 A1* | 3/2012 | Long et al. | 428/446 |
| 2012/0070641 A1* | 3/2012 | Choi et al. | 428/215 |
| 2013/0095305 A1* | 4/2013 | Choi et al. | 428/201 |
| 2013/0105765 A1* | 5/2013 | Haensch et al. | 257/29 |
| 2013/0188664 A1* | 7/2013 | Xie et al. | 372/107 |
| 2013/0313522 A1* | 11/2013 | Nourbakhsh et al. | 257/29 |
| 2014/0042393 A1* | 2/2014 | Haensch et al. | 257/29 |
| 2014/0120270 A1* | 5/2014 | Tour et al. | 427/596 |
| 2014/0191331 A1* | 7/2014 | Price et al. | 257/390 |
| 2014/0238591 A1* | 8/2014 | Choi et al. | 156/246 |

FOREIGN PATENT DOCUMENTS

| | | | | |
|---|---|---|---|---|
| KR | 1020120137048 A | 12/2012 | | |
| WO | 2004/109750 A2 | 12/2004 | | |
| WO | WO 2014/021640 A1 * | 2/2014 | | H01L 31/042 |

OTHER PUBLICATIONS

Kazumichi Yokota, et al., "Carrier Control of Graphene Driven by the Proximity Effect of Functionalized Self-assembled Monolayers", American Chemical Society, Nano Lett. vol. 11, pp. 3669-3675; Published: Aug. 17, 2011.

* cited by examiner

METHOD OF TRANSFERRING GRAPHENE

CROSS-REFERENCE TO RELATED APPLICATION

This application claims priority to and the benefit of Korean Patent Application No. 10-2013-0022261 filed in the Korean Intellectual Property Office on Feb. 28, 2013, the entire contents of which are incorporated herein by reference.

BACKGROUND OF THE INVENTION (a) Field of the Invention

The present invention relates to a method of transferring graphene.

(b) Description of the Related Art

In order to analyze material characteristics and electrical characteristics of a large-area graphene grown on metal, a process of moving the graphene to an insulating film or an insulating substrate is essential. To this end, a method of growing graphene, etching metal, and transferring the graphene in a floating state to a target substrate is commonly used.

Korean Patent Laid-Open Publication No. 2012-0137048 (Dec. 20, 2012) discloses a graphene transfer method.

In this graphene transfer method, since a graphene film consisting of one atomic layer is easily broken by a small surrounding force, a method of forming a support surface, such as polymethyl methacrylate (hereinafter referred to as "PMMA"), by coating, moving the support surface to a desired substrate, and finally removing the PMMA is being used in order to obtain a large-area graphene. PMMA that is not fully removed in this process deteriorates the electrical characteristics of the grapheme, which become a major cause of not realizing theoretically expected electrical characteristics and effects even in devices using the grapheme. In order to solve the problems, a variety of washing methods and methods of removing PMMA residues through heat treatment after transfer have been used, but the creation of PMMA residues cannot be perfectly prevented.

Furthermore, active researches have recently been carried out on materials having new characteristics obtained by combining a self-assembled monolayer (SAM) and graphene. In the case of the functional graphenes, there have been reports on changing the work function of the graphene, controlling a doping concentration, or improving the mobility of charges. However, in the graphenes, basically, a SAM is deposited on a substrate and graphene is transferred to a surface of the substrate on which PMMS is supported. Accordingly, there are problems in that lots of residues are present at the interface of the graphene and the SAM and in a surface of the graphene, and the removal of the residues using an organic solvent or heat treatment is greatly limited.

SUMMARY OF THE INVENTION

The present invention has been made in an effort to provide a method of transferring graphene having an advantage of a simplified manufacturing process with no residues remained after fabrication.

According to an embodiment of the present invention, a method of transferring graphene may include forming a graphene layer by composing graphene and a base layer, depositing a self-assembled monolayer on the graphene layer, and separating a combination layer including the self-assembled monolayer and the graphene layer from the base layer.

Here, the separating of a combination layer including the self-assembled monolayer and the graphene layer from the base layer may include separating the combination layer from the base layer with an etchant using the self-assembled monolayer as a support surface.

The method may further include transferring the combination layer to a substrate, after separating a combination layer, including the self-assembled monolayer and the graphene layer, from the base layer.

Here, the transferring of the combination layer to a substrate may include closely adhering the self-assembled monolayer to the substrate.

Here, the transferring of the combination layer to a substrate may include closely adhering the graphene layer to the substrate. Also, the base layer may be a copper (Cu) foil.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

In the entire specification, unless explicitly described to the contrary, the word "comprise" and variations such as "comprises" or "comprising" will be understood to imply the inclusion of stated elements but not the exclusion of any other elements.

Figure 1:
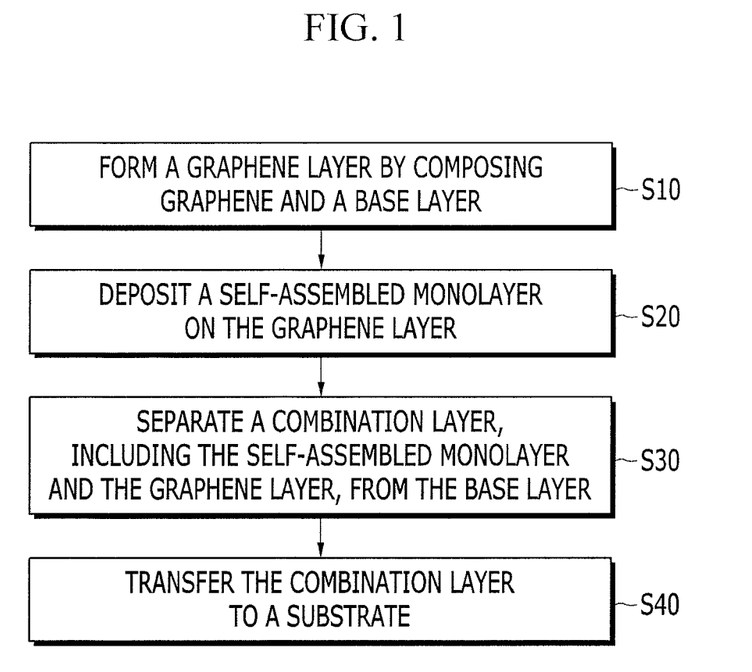
FIG. 1 is a flowchart sequentially illustrating a method of transferring graphene in accordance with an exemplary embodiment of the present invention.

FIG. 1 is a flowchart sequentially illustrating a method of transferring graphene in accordance with an exemplary embodiment of the present invention.

Referring to FIG. 1, the method of transferring graphene in accordance with an exemplary embodiment of the present invention can include forming a graphene layer by composing graphene and a base layer at step S10, depositing a self-assembled monolayer on the graphene layer at step S20, and separating a combination layer, including the self-assembled monolayer and the graphene layer from the base layer, at step S30.

The steps of the method of transferring graphene in accordance with the present invention are described in detail below with reference to the accompanying drawings.

Figure 2:
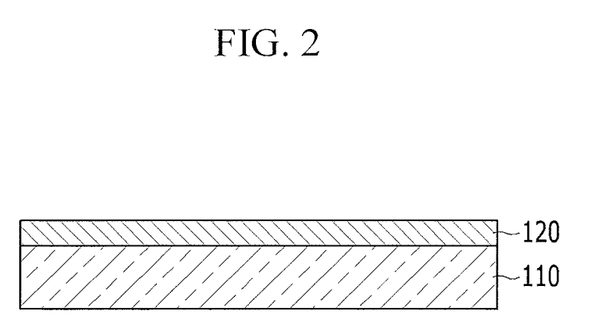
FIG. 2 is a cross-sectional view schematically showing a step of forming a graphene layer by composing graphene and a base layer.
Figure 3:
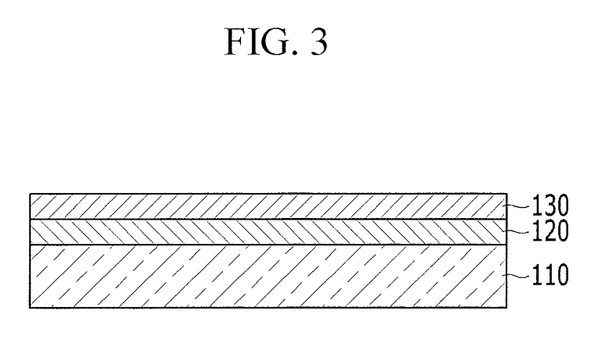
FIG. 3 is a cross-sectional view schematically showing a step of depositing a self-assembled monolayer on the graphene layer.
Figure 4:
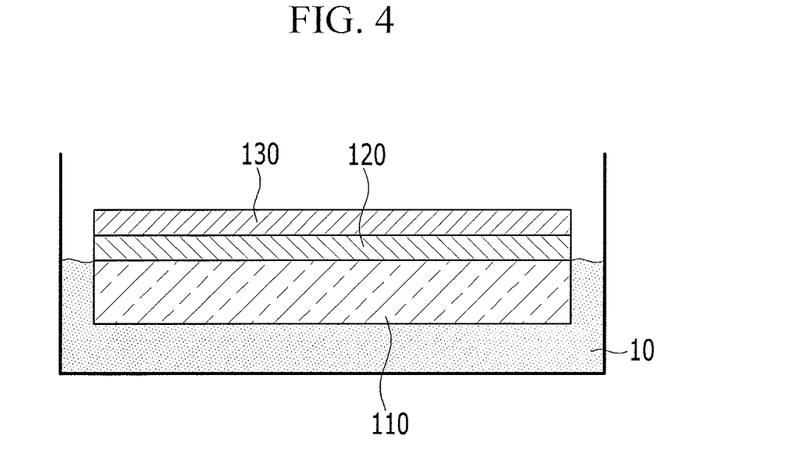
FIG. 4 is a cross-sectional view schematically showing a step of separating a combination layer, including the self-assembled monolayer and the graphene layer, from the base layer.
Figure 5:
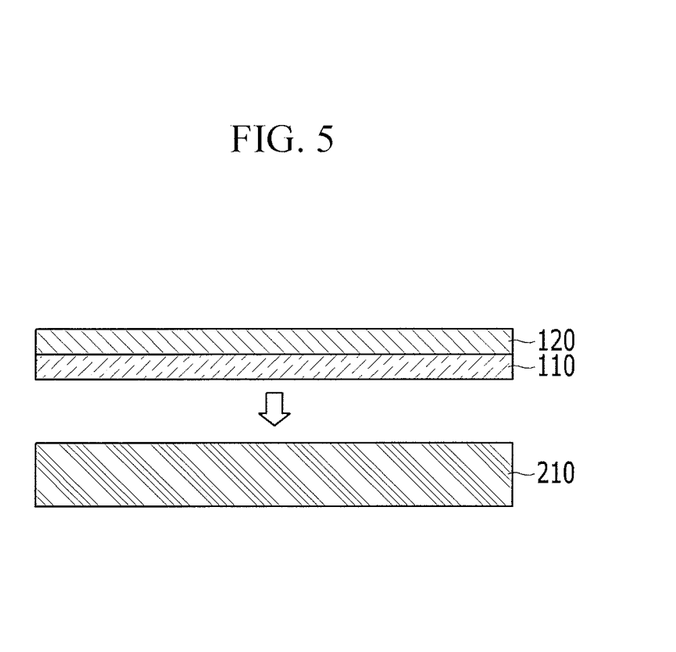
FIG. 5 is a cross-sectional view schematically showing a step of transferring the combination layer to a substrate so that the graphene layer is closely adhered to the substrate.
Figure 6:
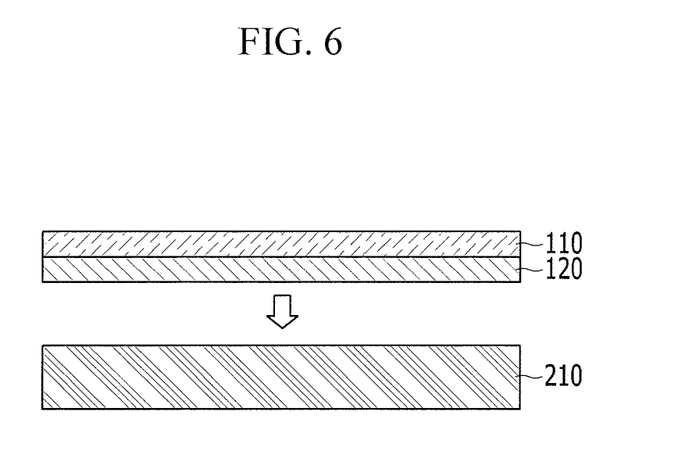
FIG. 6 is a cross-sectional view schematically showing a step of transferring the combination layer to a substrate so that the self-assembled monolayer is closely adhered to the substrate.

FIGS. 2 to 6 sequentially show steps of the method of transferring graphene shown in FIG. 1. FIG. 2 is a cross-sectional view schematically showing a step of forming a graphene layer by composing graphene and a base layer. FIG. 3 is a cross-sectional view schematically showing a step of depositing the self-assembled monolayer on the graphene layer. FIG. 4 is a cross-sectional view schematically showing a step of separating the combination layer, including the self-assembled monolayer and the graphene layer, from the base layer. FIG. 5 is a cross-sectional view schematically showing a step of transferring the combination layer to a substrate so that the graphene layer is closely adhered to the substrate. FIG. 6 is a cross-sectional view schematically showing a step of transferring the combination layer to a substrate so that the self-assembled monolayer is closely adhered to the substrate.

First, as shown in FIG. 2, a graphene layer 120 is formed by composing graphene and a base layer 110 at step S10 (refer to FIG. 1). The base layer 110 can be, for example, a copper (Cu) foil. A method of composing graphene and the base layer 110 may include a chemical vapor deposition (CVD) method, but is not limited thereto. As described above, in the process of composing graphene and the base layer 110, the graphene layer 120 can be formed on the Cu foil 110 using a CVD method in the state in which the Cu foil 110 has been disposed.

Next, as shown in FIG. 3, a self-assembled monolayer 130 is deposited on the graphene layer 120 at step S20 (refer to FIG. 1). At step S20, in order to separate the graphene layer 120 from the base layer 110, the self-assembled monolayer 130 is deposited on the graphene layer 120. The self-assembled monolayer 130 functions to support the graphene layer 120.

A molecular material capable of maintaining the structure of the graphene and controlling the electrical characteristics of the graphene can be selected from various types of materials that can be deposited on the graphene layer 120 and used as the self-assembled monolayer 130. That is, in order to determine a doping type of the graphene layer 120, the self-assembled monolayer 130 can be made of a molecular material, such as an n type (e.g., an NH2+ group) or a p type (e.g., F 4-TCNQ).

Although the self-assembled monolayer 130 is illustrated as being a single layer, the self-assembled monolayer 130 does not need to have a single layer because a principal object of the self-assembled monolayer 130 is to support the graphene layer 120. For example, the self-assembled monolayer 130 can have multiple layers of several nanometers to several tens of nanometers in thickness, which does not affect the structure of the graphene layer 120.

As shown in FIG. 4, in the process of separating a combination layer including the self-assembled monolayer 130 and the graphene layer 120 from the base layer 110 at step S30 (refer to FIG. 1), the combination layer is separated from the base layer 110 in the state in which the base layer 110 and the combination layer have been immersed in a Cu etchant 10. That is, as described above, since the combination layer is separated from the base layer 110 with the Cu etchant 10 by using the self-assembled monolayer 130 as a support surface, the graphene layer 120 can stably maintain its shape without being broken in the process of separating the combination layer.

That is, in a prior art, in order to maintain a shape of graphene, the graphene is separated from a base layer using additional PMMA and the additional PMMA is removed. In the method of transferring graphene in accordance with an exemplary embodiment of the present invention, however, the self-assembled monolayer 130 formed on the graphene layer 120 is used as a support surface without being removed.

As described above, in the method of transferring graphene in accordance with an exemplary embodiment of the present invention, an additional process of removing additional PMMA does not need to be performed because the additional PMMA is not used. Accordingly, manufacturing is possible without impurities and a manufacturing process can also be simplified, as compared with a conventional method of transferring graphene using PMMA.

Meanwhile, the method of transferring graphene in accordance with an exemplary embodiment of the present invention can further include transferring the combination layer to a substrate 210 at step S40 (refer to FIG. 1) after separating the combination layer including the self-assembled monolayer 130 and the graphene layer 120 from the base layer 110 at step S30 (refer to FIG. 1). At step S40, as shown in FIG. 5, the combination layer can be transferred to the substrate 210 so that the self-assembled monolayer 130 is closely adhered to the substrate 210.

In another embodiment, as shown in FIG. 6, the combination layer can be transferred to the substrate 210 so that the graphene layer 120 is closely adhered to the substrate 210. That is, the graphene layer 120 of the combination layer from which the base layer 110 has been removed may be transferred to the substrate 210 or the self-assembled monolayer 130 of the combination layer from which the base layer 110 has been removed depending on a structure desired by a user, thereby completing the final transfer.

Here, the substrate 210 can be made of, for example, materials having transparent or flexible properties, such as polyethylene terephthalate (PET), polycarbonate (PC), polystyrene (PS), and polyimide, in addition to a silicon oxide ($SiO_2$) substrate.

A structure of a graphene dual junction diode (i.e., a graphene p-i-n junction diode) which can be manufactured using the method of transferring graphene in accordance with an exemplary embodiment of the present invention is described in brief below with reference to FIG. 7.

Figure 7:
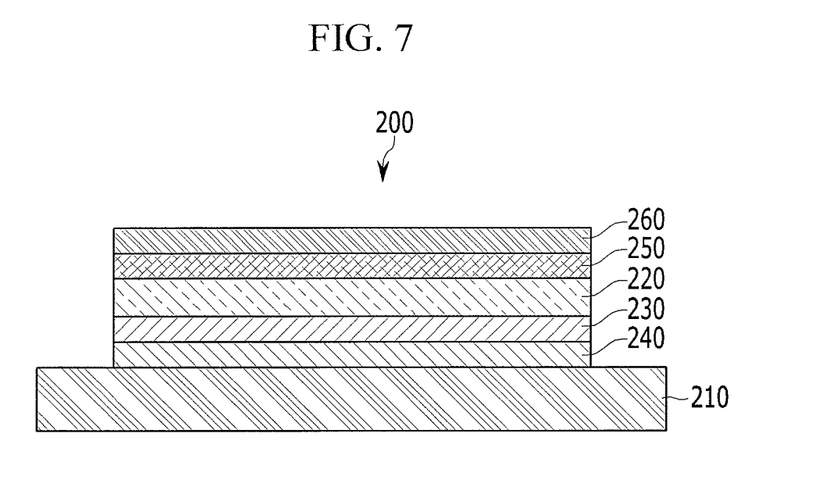
FIG. 7 is a cross-sectional view schematically showing a graphene dual junction diode (i.e., a graphene p-i-n junction diode) fabricated using the method of transferring graphene in accordance with an exemplary embodiment of the present invention.

FIG. 7 is a cross-sectional view schematically showing the graphene dual junction diode fabricated using the method of transferring graphene in accordance with an exemplary embodiment of the present invention.

Referring to FIG. 7, in the graphene dual junction diode 200, the combination layers manufactured using the aforementioned method are formed on the respective top and bottom surfaces of the insulating layer 220 over the substrate 210. More particularly, an n-type graphene layer 250 and an n-type self-assembled monolayer 260 can be sequentially formed on the top surface of the insulating layer 220 on the basis of a position close to the insulating layer 220, and a p-type graphene layer 230 and a p-type self-assembled monolayer 240 can be sequentially formed on the bottom surface of the insulating layer 220 on the basis of a position close to the insulating layer 220. Here, "the p-type graphene layer 230 and the p-type self-assembled monolayer 240" and "the n-type graphene layer 250 and the n-type self-assembled monolayer 260" are the respective combination layers each including the graphene layer 120 (refer to FIG. 4) and the self-assembled monolayer 130 (refer to FIG. 4) formed using the method of transferring graphene in accordance with an exemplary embodiment of the present invention.

A vertical n-i-p diode can be constructed from this graphene-dielectric-graphene structure. Here, n-type or p-type impurities can be selectively doped into the graphene layers 230 and 250 formed on the top and bottom surfaces of the insulating layer 220. Furthermore, the insulating layer 220 can be made of a dielectric material such as $SiO_2$, $HfO_2$, $Si_3N_4$, $HfO_2$, $ZrO_2$, $Ta_2O_5$, $TiO_2$, or a combination of them.

Furthermore, if the graphene dual junction diode 200 is used as an electronic device capable of flexibly handling a change of higher conductivity and of being transparent and bent, the insulating layer 220 can be made of a two-dimensional material, such as h-BN, $MoS_2$, $MoSe_2$, or $WSe_2$.

In the graphene dual junction diode 200 having the above structure, the graphene layers 230 and 250 themselves on which the self-assembled monolayers 240 and 260 have been deposited do not lose flexibility because the self-assembled monolayers 240 and 260 are based on a polymer. Furthermore, the graphene layers 230 and 250 having a thin and uniform film shape and a 3-dimensional shape of several nanometers in thickness can stably maintain their initial states without being broken while they are moved by the self-assembled monolayers 240 and 260. In addition, in the final graphene dual junction diode 200, a functional graphene thin film having a 2-dimensional shape with excellent adhesion reliability for the substrate 210 can be obtained.

Further, various types of self-assembled monolayer/graphene layer structures having various doping degrees of graphene and various types of graphene can be obtained by changing only the types of the self-assembled monolayers 240 and 260. Accordingly, a functional graphene having excellent electrical characteristics without an electrical defect in the structure can be manufactured.

As described above, the graphene dual junction diode 200 having the self-assembled monolayer/graphene layer structure manufactured using the method of transferring graphene in accordance with an exemplary embodiment of the present invention can be manufactured without impurities, and a process of manufacturing the graphene dual junction diode 200 can be simplified compared with an existing method using PMMA. Furthermore, the graphene dual junction diode 200 having the p-i-n structure manufactured using the method of transferring graphene in accordance with an exemplary embodiment of the present invention can have much better electrical characteristics than diodes manufactured using an existing method because impurities are fundamentally prevented from being generated in an interface or surface.

In the method of transferring graphene in accordance with an exemplary embodiment of the present invention, since additional PMMA is not used, an additional process of removing PMMA does not need to be performed. Accordingly, fabrication is possible without impurities as compared with a conventional method of transferring graphene using PMMA, and a manufacturing process can also be simplified.

Furthermore, the graphene dual junction diode having a self-assembled monolayer-graphene layer structure manufactured using the method of transferring graphene in accordance with an exemplary embodiment of the present invention can be manufactured without impurities and a manufacturing process can be simplified, as compared with an existing method using PMMA. Furthermore, the graphene dual junction diode having a p-i-n structure manufactured using the method of transferring graphene in accordance with an exemplary embodiment of the present invention can have much better electrical characteristics than diodes manufactured using an existing method because impurities are fundamentally prevented from being generated in an interface or a surface.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of transferring graphene, comprising:
   forming a graphene layer by composing graphene and a base layer;
   depositing a self-assembled monolayer on the graphene layer; and
   separating a combination layer comprising the self-assembled monolayer and the graphene layer from the base layer.

2. The method of claim 1, wherein the separating of a combination layer comprising the self-assembled monolayer and the graphene layer from the base layer comprises separating the combination layer from the base layer with an etchant using the self-assembled monolayer as a support surface.

3. The method of claim 1, further comprising:
   transferring the combination layer to a substrate after separating the combination layer comprising the self-assembled monolayer and the graphene layer from the base layer.

4. The method of claim 3, wherein the transferring of the combination layer to a substrate comprises closely adhering the self-assembled monolayer to the substrate.

5. The method of claim 3, wherein the transferring of the combination layer to a substrate comprises closely adhering the graphene layer to the substrate.

6. The method of claim 1, wherein the base layer is a copper (Cu) foil.

* * * * *